(12) United States Patent
Ehrich et al.

(10) Patent No.: US 7,308,649 B2
(45) Date of Patent: Dec. 11, 2007

(54) PROVIDING SCALABLE, ALTERNATIVE COMPONENT-LEVEL VIEWS

(75) Inventors: Nathanael F. Ehrich, Raleigh, NC (US); Niraj P. Joshi, Cary, NC (US); Kimberly D. Kenna, Cary, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 10/674,769

(22) Filed: Sep. 30, 2003

(65) Prior Publication Data

US 2005/0071757 A1    Mar. 31, 2005

(51) Int. Cl.
*G06F 15/00* (2006.01)
(52) U.S. Cl. ............ 715/513; 715/523; 715/501.1
(58) Field of Classification Search ............ 715/513, 715/523, 501.1, 781, 760, 738; 709/217–219
See application file for complete search history.

(56) References Cited

U.S. PATENT DOCUMENTS

| | | | |
|---|---|---|---|
| 5,655,130 A | | 8/1997 | Dodge et al. |
| 5,887,133 A | * | 3/1999 | Brown et al. ............ 709/200 |
| 5,911,145 A | | 6/1999 | Arora et al. |
| 5,999,912 A | * | 12/1999 | Wodarz et al. ............ 705/14 |
| 6,014,694 A | | 1/2000 | Aharoni et al. |
| 6,023,714 A | * | 2/2000 | Hill et al. ............ 715/513 |
| 6,028,603 A | | 2/2000 | Wang et al. |
| 6,097,389 A | | 8/2000 | Morris et al. |
| 6,119,136 A | * | 9/2000 | Takata et al. ............ 715/513 |
| 6,226,001 B1 | | 5/2001 | Bardon et al. |
| 6,226,642 B1 | * | 5/2001 | Beranek et al. ............ 707/10 |
| 6,256,037 B1 | | 7/2001 | Callahan |
| 6,278,462 B1 | | 8/2001 | Weil et al. |
| 6,300,947 B1 | * | 10/2001 | Kanevsky ............ 715/866 |
| 6,457,030 B1 | * | 9/2002 | Adams et al. ............ 715/523 |
| 6,463,440 B1 | | 10/2002 | Hind et al. |
| 6,493,734 B1 | | 12/2002 | Sachs et al. |
| 6,526,426 B1 | | 2/2003 | Lakritz |
| 6,606,544 B2 | | 8/2003 | Glenn et al. |
| 6,708,309 B1 | * | 3/2004 | Blumberg ............ 715/530 |
| 6,842,768 B1 | | 1/2005 | Shaffer et al. |

(Continued)

OTHER PUBLICATIONS

"XML Element Forms: Building Blocks of XML-Based Applications", *Research Disclosure Bulletin*, n428 (Dec. 1999) No. 95, International Business Machines Corporation, pp. 1658-1659.

(Continued)

*Primary Examiner*—Stephen Hong
*Assistant Examiner*—Thu Huynh
(74) *Attorney, Agent, or Firm*—Marcia L. Doubet; Andre M. Gibbs

(57) ABSTRACT

Techniques are disclosed for improved handling of alternative content selection. Using these techniques, content designers specify alternative content views that are designed for use under different conditions, and a particular alternative view is programmatically selected (according to applicable conditions) when preparing content for delivery to a target. Preferably, the alternative views are provided on a component-level basis, where the selected component view or version then forms part of a larger view (such as a Web page). Optionally, more than one component may be designed to vary simultaneously. In this case, the components may vary independently of one another.

9 Claims, 5 Drawing Sheets

U.S. PATENT DOCUMENTS

| | | |
|---|---|---|
| 6,857,102 B1 | 2/2005 | Bickmore et al. |
| 6,938,077 B2 * | 8/2005 | Sanders .................. 702/219 |
| 6,966,034 B2 * | 11/2005 | Narin ..................... 715/744 |
| 2001/0044809 A1 * | 11/2001 | Parasnis et al. ............. 707/513 |
| 2002/0099829 A1 | 7/2002 | Richards et al. |
| 2002/0122054 A1 * | 9/2002 | Hind et al. ................. 345/731 |
| 2002/0124020 A1 | 9/2002 | Janakiraman et al. |
| 2003/0009694 A1 * | 1/2003 | Wenocur et al. ............ 713/201 |
| 2003/0011631 A1 * | 1/2003 | Halahmi ................... 345/744 |
| 2003/0069975 A1 * | 4/2003 | Abjanic et al. ............. 709/227 |
| 2003/0167334 A1 | 9/2003 | Butler |
| 2005/0120075 A1 | 6/2005 | Aasman et al. |

OTHER PUBLICATIONS

The Automated Design and Code Writing System, Information on the use of Computer Program Flowchard and LogicCoder., May 2002, pp. 1-14, Logic Code Generator, London, United Kingdom, <http://logiccoder.com/AboutFlowCharting.htm>.

* cited by examiner

FIG. 1

```
     <HTML>
     <TITLE>My Traffic Report</TITLE>
     <BODY>  111    112       113      114
110  <ALTlet id="altlet1" type="subscription" width="300" height="300">
120    <view id="view1" name="basic" value="trafficLocationXYZ.txt" />  125
130    <view id="view2" name="intermediate"
              value="http://www.MyRushHour.com/XYZ.jpg" />  135
140    <view id="view3" name="premium"
              value="http://www.MyRushHour.com/XYZ.mpeg" />  145
     </ALTlet>
150  <img src="http://www.MyRushHourAds/adNumber1.img">
160  <img src="http://www.MyRushHourAds/adNumber2.img">
     </BODY>
     </HTML>
```

My Traffic Report

As of 12:30 p.m., traffic is moderately congested on Route 123.

(Ad Number 1)  (Ad Number 2)

[Refresh]  [Close]

My Traffic Report

(Image of traffic on Route 123)

(Ad Number 1)  (Ad Number 2)

[Refresh]  [Close]

```
<HTML>
<TITLE>My Traffic Report</TITLE>
<BODY>
As of 12:30 p.m., traffic is moderately congested on Route 123. 310
<img src="http://www.MyRushHourAds/adNumber1.img"> 320
<img src="http://www.MyRushHourAds/adNumber2.img"> 330
</BODY>
</HTML>
```

```
<HTML>
<TITLE>My Traffic Report</TITLE>
<BODY>
110 <ALTlet id="altlet1" type="subscription" width="300" height="300">
      <view id="view1" name="basic" value="trafficLocationXYZ.txt" />
      <view id="view2" name="intermediate"
        value="http://www.MyRushHour.com/XYZ.jpg" />
      <view id="view3" name="premium"
        value="http://www.MyRushHour.com/XYZ.mpeg" />
    </ALTlet>                        ⟵ 411
410 <ALTlet id="altlet2" type="advertisement" width="300" height="150">
420   <view id="view1" name="basic"
        value="http://www.MyRushHour.com/BasicAd.jpg" />
430   <view id="view2" name="intermediate"
        value="http://www.MyRushHour.com/IntermediateAd.jpg" />
440   <view id="view3" name="premium"
        value="http://www.MyRushHour.com/PremiumAd.jpg" />
    </ALTlet>
</BODY>
</HTML>
```

400

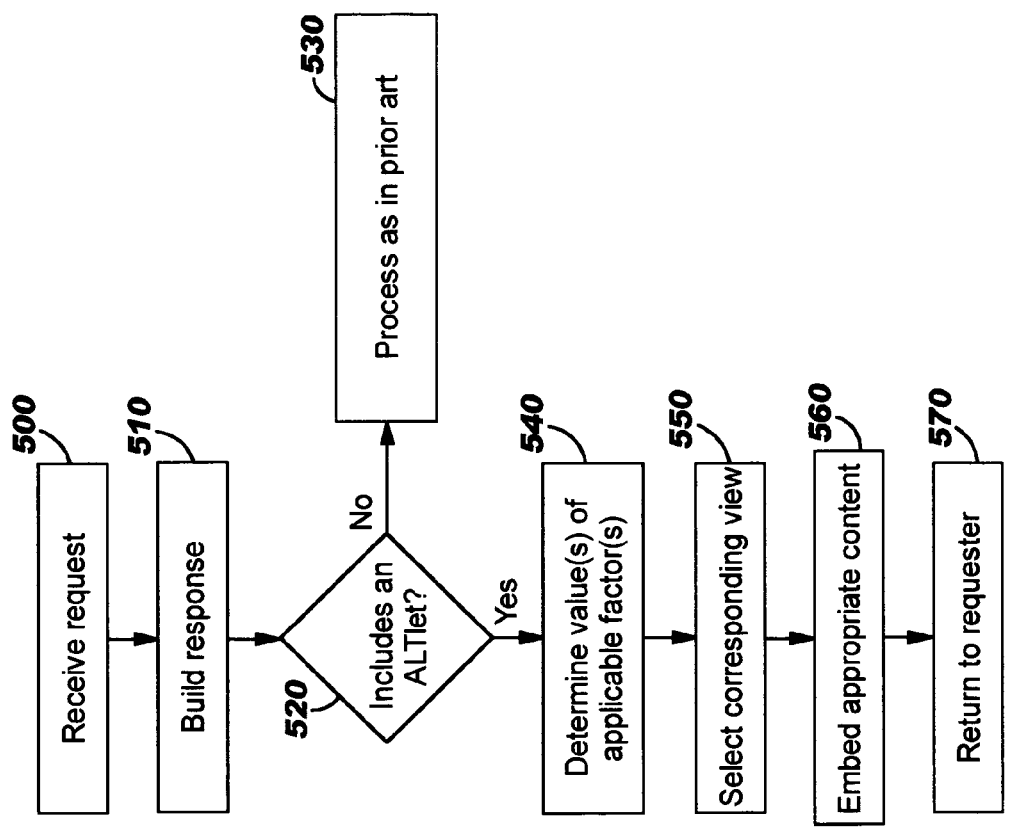

PROVIDING SCALABLE, ALTERNATIVE COMPONENT-LEVEL VIEWS

RELATED INVENTIONS

The present invention is related to commonly-assigned, co-pending U.S. patent application Ser. No. 10/675,418, titled "Client-Side Processing of Alternative Component-Level Views. The related application (referred to herein as "the related invention") was filed concurrently herewith and is hereby incorporated herein by reference.

BACKGROUND OF THE INVENTION

1. Field of the Invention

The present invention relates to client/server computing, and deals more particularly with techniques for dynamically selecting from among a plurality of scalable, alternative component-level views when preparing content for delivery to a target (such as a client workstation).

2. Description of the Related Art

The popularity of client/server computing has increased tremendously in recent years, due in large part to growing business and consumer use of the public Internet and the subset thereof known as the "World Wide Web" (or simply "Web"). Other types of client/server computing environments, such as corporate intranets and extranets, are also increasingly popular. As solutions providers focus on delivering improved Web-based computing, many of the solutions which are developed are adaptable to other client/server computing environments. Thus, references herein to the Internet and Web are for purposes of illustration and not of limitation. (Furthermore, the terms "Internet", "Web", and "World Wide Web" are used interchangeably herein.)

Millions of people use the Internet on a daily basis, whether for their personal enjoyment or for business purposes or both. As consumers of electronic information and business services, people now have easy access to sources on a global level. When a human user is the content requester, delays or inefficiencies in returning responses may have a very negative impact on user satisfaction, even causing the users to switch to alternative sources. Delivering requested content quickly and efficiently is therefore critical to user satisfaction. Furthermore, if the content contains advertising or similar promotional information, delivering content to end users in a timely manner may be required to meet contractual obligations with, and/or to ensure repeated business with, the advertisers and promoters.

Most modern computing applications render their displayable output using a graphical user interface, or "GUI". In a client/server computing environment such as the Internet, client software known as a "browser" is typically responsible for requesting content from a server application and for rendering the information sent by the server in response. Commonly, the displayed information is formatted as a Web page, where the layout of the Web page is defined using a markup language such as Hypertext Markup Language ("HTML").

Designing a Web site to serve the needs of a varied audience is a complex undertaking. A Web page providing stock quotes, for example, may be of interest to end users whose computing devices range from cellular phones and other handheld devices with limited display space to powerful desktop workstations with a relatively large amount of display space. A Web page designer may choose to focus the page layout toward the capabilities of the higher-end computing devices, in order to improve the viewing experience of that subset of the potential users. This may result in a Web page that is difficult or impossible to use from a lower-end or constrained device.

Similarly, designing a Web site that operates well under varied network conditions may be challenging. Web pages containing rich multimedia content, for example, may provide an enjoyable viewing experience for users of full-function computing devices that are connected to servers over high-speed network connections. On the other hand, if users of limited-function devices access these same pages, or if the pages are accessed using low-speed connections or during periods of network congestion, the end user may be quite displeased.

Techniques are known in the art that consider factors such as current network conditions, capabilities of the client device, and preferences of the end user when preparing content to be delivered from a server. Commonly-assigned U.S. Pat. No. 6,138,156, titled "Selecting and Applying Content-Reducing Filters Based on Dynamic Environmental Factors", discloses techniques with which environmental factors can be used to dynamically filter the content being delivered from a server to a user's workstation. The environmental factors include characteristics of the target device, such as its available storage capacity, and billing information related to the user's account with his connection service provider. These factors are used with a rule-based approach to select a transcoding filter to be applied to a document before delivering it to a requesting user. If the end user's device has limited available storage, for example, then a color image to be rendered on a Web page might be transcoded to gray-scale, or even completely omitted, before sending content to this device.

Commonly-assigned U.S. Pat. No. 6,681,380 (Ser. No. 09/504,209, filed Feb. 15, 2000, which is titled "Aggregating Constraints and/or Preferences Using an Inference Engine and Enhanced Scripting Language", teaches techniques for aggregating constraints and/or preferences using an inference engine and an enhanced scripting language. Values of multiple factors and the interrelationships between the factors and their values are ed, and the result is used to tailor or direct the processing of a software program. A rule-based system is disclosed therein for aggregating information, and based on the aggregated result, one or more transformations are performed on a requested document before transmitting it to the requester. The particular transformations to be performed may be tailored to constraints such as one or more of the capabilities of the client device; the connection type over which the content will be delivered the network bandwidth of the connection the type of user agent operating on the client device; preferences of a particular user; preferences set by a systems administrator or other such person (or preferences generated in an automated manner); preferences for a particular application executing in a particular contain; etc. According to preferred embodiments of this commonly-assigned invention, the aggregated result is made available to an application program, which will use the result to tailor its own processing. This technique avoids having to change the software process itself as new values and/or new factors are deemed to be important to the aggregation result.

Commonly-assigned U.S. patent application Ser. No. 09/442,015, filed Nov. 17, 1999 (now abandoned), which is titled "Context-Sensitive Data Delivery Using Active Filtering", discloses techniques for providing coated-sensitive data delivery using active filtering to tailor the delivered data content. Preferably, a server maintains information about the typical device types to which it serves data, and continually pre-filters available data for delivery to these devices. Style sheets are used to perform one or more device-specific filtering transformations. In delivering content to a particular device, the server receives a device certificate from the device, and uses this information to identify the device type and the device's user. A user's stored preferences and/or access privileges can then be determined, and this information can be used to refine or filter information available from the server. In particular, this invention discloses filtering information to account for one or more of: an identification of a user of the device; privileges (also referred to conversely as limitations) and/or preferences of the user; the location, device type, and/or device capabilities of the user's device; and the current time.

In another prior art approach, Web sites may implement a choice of two content views, one providing high graphic content and the other providing low graphic content, thereby providing alternative views. Sometimes, the end user is given the choice of which view he wants to see (e.g., by having a graphical button on the Web page that can be clicked to select one content type or the other). Or, using a prior art "<IMG>" (image) tag in a Web page, the content designer can specify that the type of content (either an image file or a substituted text message) to be delivered to the client can be selected using factors such as device type or server load. However, this approach generally provides a binary decision, whereby a selection is limited to two choices.

Accordingly, what is needed are techniques for improved handling of alternative content selection.

SUMMARY OF THE INVENTION

An object of the present invention is to provide techniques for improved handling of alternative content selection.

Another object of the present invention is to provide techniques that enable content designers to specify alternative content views that are designed for use under different conditions.

Still another object of the present invention is to provide techniques for programmatically selecting a particular alternative view of component-level content.

Yet another object of the present invention is to provide techniques whereby a content designer specifies two or more alternative content, or component-level, views along with conditions under which a particular alternative view should be selected.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for dynamically selecting from among a plurality of alternative component-level views when preparing content for delivery to a target. In one aspect, the present invention comprises selecting component-level views by receiving a request for content; locating a template for the requested content, wherein the template specifies a plurality of alternative views of a component that forms a portion of the content; evaluating one or more factors to determine an evaluation result, wherein the determined evaluation result corresponds to a particular one of the specified alternative views; and using the particular one of the alternative views for the portion of the content.

The request may be received from a client, and this aspect may further comprise returning a response to the client, wherein the response includes the particular one of the alternative views. The requested content may be a particular Web page, and the template may be a Web page template. In this case, the particular one of the alternative views is preferably used to generate a version of the particular Web page that reflects the one or more factors that were evaluated.

The template may be specified in a scripting language and may be embedded in a markup language document. As another alternative, the template may be specified in a markup language document. In this case, each of the alternative views may be specified as a child element of a particular parent element, wherein each child element has as it's a value its associated alternative view.

Optionally, the template may specify alternative views for a plurality of components, in which case the evaluation is performed for each of the specified components, and each of the selected alternative views is used for the corresponding portion of the content.

Using the selected alternative view may further comprise omitting, from the response, the specification of the alternative views which were not selected by the evaluation. Or, the selected alternative view may be substituted for the specification of the plurality of alternative views.

In another aspect, the present invention comprises generating content using alternative component-level views by: determining that content should be generated from a particular template, wherein the template specifies a plurality of alternative views of a component that forms a portion of the content and also specifies an associated selection identifier for each of the specified alternative views; evaluating one or more factors to determine an evaluation result, wherein the determined evaluation result corresponds to a particular one of the selection identifiers, thereby selecting the associated one of the specified alternative views; and using the selected alternative view for the portion of the content to generate a version of the content.

Using the selected alternative view may further comprise embedding the selected alternative view, or an identifier thereof, into the generated version of the content.

Either aspect may further comprise distributing the content, including the selected alternative view(s), to a destination, or storing that content in a repository.

The present invention will now be described with reference to the following drawings, in which like reference numbers denote the same element throughout.

BRIEF DESCRIPTION OF THE DRAWINGS

FIG. 1 provides a sample HTML document showing representative syntax with which alternative, selectable component views may be identified, according to the present invention;

FIGS. 2A and 2B show samples of how selected components may be rendered to provide scalable, component-level views, according to the present invention;

FIG. 3 provides sample HTML syntax showing a response document created by a server after programmatically eliminating references to non-applicable content sources for a component, as disclosed herein;

FIG. 4 provides a sample HTML document illustrating alternative, dynamically-selectable views for more than one component, according to an optional aspect of the present invention; and FIG. 5 provides a flowchart depicting logic that may be used to implement preferred embodiments of the present invention.

DESCRIPTION OF PREFERRED EMBODIMENTS

The present invention provides novel techniques for improved handling of alternative content selection. Using these techniques, content designers specify alternative content views that are designed for use under different conditions, and a particular alternative view is programmatically selected (according to applicable conditions) when preparing content for delivery to a target. (Preferred embodiments are described with reference to targets that are requesting client workstations, although this is by way of illustration and not of limitation.)

According to preferred embodiments of the present invention, a content designer identifies, at design time, multiple versions (also referred to as multiple views) of a component that will form part of a rendered Web page. The content of the Web page will then vary dynamically at run time, depending on which version of the component is selected for delivery. Preferred embodiments of the present invention use a markup-language notation or scripting-language notation for specifying, within the framework of a Web page (also referred to herein as a "Web page template"), the syntax for selectable alternative views. The term "ALTlet" is used herein to refer to the syntax with which a particular component's alternative views are specified.

Optionally, an implementation of the present invention may allow more than one component of a particular Web page to vary simultaneously, and therefore references to varying "a" component, or one component, are illustrative but not limiting. Preferred embodiments specify a separate ALTlet (i.e., separate ALTlet syntax) for each such component. When multiple ALTlets are specified in a single Web page template, a particular view for each dynamically-variable component can then be selected independently using this single Web page template. Alternatively, it may be desirable in some cases for the particular view that is selected for one dynamically-variable component to dictate which view is selected for one or more other dynamically-variable components within the same Web page. Examples will be described herein.

FIG. 1 illustrates use of a single ALTlet, and FIG. 4 illustrates use of multiple ALTlets. These figures are discussed in more detail below.

Preferred embodiments of the present invention operate at a server, responsive to receiving a content request. Applicable factors or conditions are evaluated as the server creates a Web page for delivery to the requester. A Web page having a component view or views that is/are selected according to the evaluation is then returned in a response message to the requester. Factors considered by preferred embodiments may include (by way of illustration) one or more of the following types of external stimuli: (1) device type used by the requester; (2) bandwidth limitations, if any; (3) subscription level of the requester; and (4) other types of system/network factors such as processor capacity or current network load.

The related invention defines client-side processing techniques, whereby one or more components of a Web page received at a requesting client may be dynamically varied when the Web page is rendered, based on run-time factors such as a varying amount of display "real estate" that is available for rendering the Web page. For example, if the end user resizes a window in which the Web page is displayed, components of the Web page may be dynamically altered in response. Refer to the related invention for more information on these client-side techniques. Using client-side ALTlets, as described therein, allows a Web page designer to specify which alternative component-level view(s) should be used under dynamically-varying client-side conditions.

Returning to discussion of the server-side techniques of the present invention, suppose, as an example, that a company markets a Web page service for delivery of current traffic conditions. Many people may be interested in this service, and in particular, people who need to drive in areas having heavy traffic may wish to use this service to identify preferred travel routes (or routes to be avoided). The Web page of this hypothetical service, using a variable-level subscription business model, delivers a view of traffic ranging from a simple text description to live video feed, based on the subscription level (e.g., whereby several different levels of content are available at varying subscription rates). When the Web pages are rendered, the traffic report content from this hypothetical service is to be surrounded by a collection of advertisements.

A number of different combinations of advertisements may be available, and the company may wish to change its advertisements over time. The company may also wish to change its subscription model over time. As a result, there may be a potentially-unmanageable number of different Web pages to be created and managed. The company's information technology ("IT") professionals can therefore leverage techniques of the present invention, whereby a selection from among Web page components that are specified in a Web page template can be made programmatically, based on applicable factors, without requiring modification of the Web page itself. (In this scenario, the "applicable factors" include the subscription level, and may include other factors such as the type of target device and current network conditions, as will be discussed in more detail herein.)

Continuing with the traffic conditions example, suppose the company wishes to provide three different subscription levels. A basic subscription level might be free, and users at this level might be provided only with a static textual description of traffic conditions that is updated at some interval (such as once every half hour). At this level, the company will rely on advertisements to help defray costs, and therefore wishes to ensure that some amount of advertising is always present with the rendered traffic report. An intermediate subscription level might provide a snapshot image of a particular roadway of interest to this subscriber, and this snapshot might be updated perhaps once every ten minutes. A premium subscription level might provide a live video feed of the roadway.

Using techniques of the present invention, the company's IT professionals can design a Web page where one or more components of the content will vary, even though multiple versions of that Web page do not need to be manually created. Instead, according to preferred embodiments, the Web page is created as a type of template, and syntax within that template specifies the selectable versions of components within that Web page, as noted above. Along with each selectable version of a component, syntax is specified that enables a programmatic selection to be made, such that the desired selectable version can then be "plugged in" at run time.

FIG. 1 provides a sample HTML document showing representative syntax with which alternative, selectable component views may be identified. This syntax is merely illustrative, and other syntax may be used without deviating from the scope of the present invention. As shown in sample document 100 of FIG. 1, an ALTlet tag 110 uses multiple child elements, which in the example have the element name "view" and are illustrated at 120, 130, 140, to specify alternative versions of content for a Web page component. In this example, the ALTlet tag 110 also includes an "id" attribute 111, a "type" attribute 112, a "width" attribute 113, and a "height" attribute 114. These attributes will now be described, and the child "view" elements will then be described.

Preferably, the "id" attribute 111 is used to associate an identifier ("altlet1", in this case) with the ALTlet specification 110. This facilitates identification of each ALTlet when more than one ALTlet is included in a particular Web page or markup language document. (Refer to FIG. 4, below, for an example of specifying more than one ALTlet per document.) The "type" attribute 112, which in this example has the value "subscription", indicates what type of ALTlet this is. Preferably, this value is used during evaluation of factors, when a Web page is being created, to identify which factors should be evaluated. (This value may also be used to enable mapping the evaluation result to the appropriate one of the selectable views. Refer to the discussion of Blocks 540 and 550 of FIG. 5, below.) The "width" attribute 113 and "height" attribute 114 are optional, and preferably indicate the size of the display space to be used when a selected view of this component is rendered.

In some cases, it may be desirable to allow a varying width and/or height for the selectable views of an ALTlet, and thus values of attributes 113, 114 may be treated as preferred values. (Width and/or height attributes may optionally be specified on one or more of the view elements within an ALTlet, in which case those values preferably take precedence over values specified on the ALTlet tag.)

The first "view" element 120 for ALTlet tag 110 is used to specify a component view to use with a basic subscription level to the hypothetical traffic report service, where the Web page designer has identified (using a "value" attribute) a text file 125 for delivery to requesters for which this view is applicable. (The manner in which an implementation determines which view is applicable will be described in more detail below, with reference to FIG. 5.) View element 120 also includes an "id" attribute and a "name" attribute, which in the example have values of "view1" and "basic", respectively. The Web page designer has also specified, in a second view element 130, "id" and "name" attribute values of "view2" and "intermediate", and a "value" attribute identifying an image (i.e., ".jpg") file 135 to be delivered to requesters according to this view. Finally, view element 140 has "view3" and "premium" as the value of its "id" and "name" attributes, and specifies an associated video feed 145 for delivery to premium-level subscribers. (Although three alternative view specifications are presented in this example, an implementation of the present invention may choose to support any number of alternative views, thereby allowing for a wide array of alternative content to be selected for a particular component.)

Instead of using multiple attributes on a single "view" tag as illustrated in FIG. 1, an implementation of the present invention may use an alternative syntax without deviating from the concepts disclosed herein. For example, the "<view>" tag may be defined as a parent element having, as its children, "<id>", "<name>", and "<value>" elements. In this case, element values are used instead of attribute values for specifying information about the selectable views. An implementation of the present invention is preferably adapted for supporting either attribute values or child element values, but may alternatively support both approaches. Note that the example in FIG. 1 uses syntax that extends the current HTML syntax. According to preferred embodiments, these extensions are removed before sending the content to the client (as described below with reference to FIG. 5), in which case it is not necessary to change client-side code such as browsers. (Note that if an implementation of the present invention is used in combination with an implementation of the related invention, then syntax for specifying the client-side selectable component views is passed through to the client side. Refer to the related invention for more details.)

As an alternative to using HTML extensions for specifying ALTlets, a different markup language may be used such as Extensible Markup Language ("XML") which, by definition, is inherently extensible. Other markup languages with which ALTlets may be specified include, by way of illustration only, Wireless Markup Language ("WML"), Extensible Hypertext Markup Language ("XHTML"), and so forth. As another alternative, scripts encoded in the JavaScript® scripting language may be used for specifying ALTlets, without deviating from the scope of the present invention. ("JavaScript" is a registered trademark of Sun Microsystems, Inc.)

FIGS. 2A and 2B shows samples 200, 250 of how this subscription-level-specific content may appear on a client device for subscribers in the basic and intermediate levels, respectively. As represented therein, textual content describing traffic conditions is rendered for basic-level subscribers and an image depicting traffic conditions is rendered for intermediate-level subscribers. In these samples, two images presenting advertising content are also to be displayed to the user, where these images are retrieved from the locations which are specified in the Web page template at 150, 160 and which are passed through to the client in the response document 300 of FIG. 3, as shown at 320, 330.

Several prior art approaches to dynamically selecting Web page content will now be described, in order to contrast prior art approaches with the novel techniques disclosed herein.

In the prior art, one Web page would be defined for the basic content level represented by FIG. 2A, and another Web page would be defined for the intermediate content level represented by FIG. 2B (with yet another Web page defined for the premium content level, which in the example service is a moving, real-time image and has therefore not been illustrated). The present invention, in contrast, allows use of a single Web page template or source document which identifies each of the alternative content sources, giving the Web page designer much more granular control than was previously available. And as noted earlier, techniques of the present invention enable more than one component within a single Web page to vary dynamically, whereas prior art techniques used a separate Web page for each combination of different component-level views. Use of the present invention therefore reduces the administrative burden on IT professionals, who have fewer Web pages (i.e., Web page markup-language files) to maintain.

In another prior art technique, the "<IMG>" (image) tag currently supported in HTML provides for a very limited specification of alternative content. Using this existing tag, a "src" (source) attribute specifies an address of an image to be rendered in a Web page, and an optional "alt" (alternative) attribute can be used to specify textual content that may be rendered in place of the image. (The client-side decision of which content to render in a particular situation may depend on processing constraints, user preferences, and so forth.) A maximum of two alternatives for the rendered content are possible, and the content types are limited to images and text, when using the existing <IMG> tag. As can be seen from the simple example presented in FIG. 1 (and the more complex example presented in FIG. 4), use of the present invention enables Web page designers to go well beyond the binary choices available using this prior art <IMG> tag, such that widely-varying viewing experiences can be provided for end users.

Portal servers of the prior art may provide for varying display content based on whether a portlet is displayed in its maximized form or in a minimized form. However, this is a static, binary client-side decision, providing only one or the other of two views. This differs from the techniques disclosed herein whereby a server-side selection is made from among a variable number of views for each of one or more individual components.

The present invention also differs from prior art transcoding techniques, whereby one of several different versions of a single source file may be delivered to clients, each version being created by performing a programmatic transformation of a single source file. According to techniques disclosed herein, multiple views (e.g., source selections) for each of one or more particular components are identified at design time, and in preferred embodiments, a selected one of each of these component-level views is delivered to a client without requiring a programmatic transformation of the component itself.

Referring again to the example syntax in FIG. 1, suppose that a run-time determination of the requesting client's subscription level indicates that this is a client who is using the basic subscription level. According to preferred embodiments, the server preparing a response to the client's request programmatically eliminates references to the non-applicable content sources or views, and returns an HTML document reflecting the content which is appropriate for this subscription level. Sample HTML syntax for the response document is shown in document 300 of FIG. 3. In this example, the 3 view elements 120, 130, 140 from FIG. 1 have been replaced with a single selected view, which is specified at 310 (where the textual content that has been embedded in the Web page represents selection of the "basic" subscription level). Upon receiving this markup language document, the client browser renders a Web page accordingly, thereby transparently providing the end user with content that is tailored to his subscription level.

Note that in the example in FIG. 1, a Uniform Resource Locator or "URL" has been used for identifying the locations where the intermediate-level content and the premium-level content are stored. If one of these component versions is selected, the specified URL is preferably embedded in the response document that is delivered to the client, causing the client browser to automatically request content stored at that location from a server. This automatic request preferably occurs using prior art techniques. As has been illustrated at element 310 in FIG. 3, on the other hand, depending on the content type of the selected component-level view, it may be desirable in many cases to embed the selected content directly into the response file or document that is to be delivered to the client.

In general, techniques of the present invention may be used to vary the richness of content among a variable number "N" of component-level views. Scalable content can then be prepared for delivery to a client by selecting from among these N views for that component. This variation among views may optionally be extended to "M" different components within a particular Web page (as has been noted above), and therefore a single Web page template created using ALTlets as disclosed herein is capable of representing M*N different potential viewing experiences for the end user.

Alternative component-level views of the type illustrated by the examples described thus far may be appropriate in many scenarios other than subscription levels. In addition, an interplay of multiple factors may be used when selecting among available views for a component. A template or parent document specifies the selectable views or versions, and this template is programmatically altered to reflect the selected version when preparing a response for a client, as has been illustrated.

Content provided within a Web page is often used to bring end users to the page with the ulterior motive of displaying advertising to those users. Often, the content is displayed in the center of the Web page, and the advertisements are placed along one or more sides of the displayed page. The present invention provides flexible, easy-to-use techniques for varying the content dynamically without modifying the Web page markup. Prior art techniques may optionally be used to vary the advertisement content, if desired. For example, by specifying an array of advertisement identifiers using a scripting language such as JavaScript, an advertisement can be dynamically selected from the array for display to the user. Each time the user refreshes the display, a different one of the advertisements identified in the array may be displayed. As an alternative to using prior art techniques, techniques disclosed herein may be used for specifying dynamically-selectable versions of the advertisements, wherein the selection is to be based on one or more dynamically-variable factors. In this case, an ALTlet is preferably used for specifying a selection of advertisement component views, similar to the manner in which the content component was varied in the example shown in FIG. 1.

Referring now to FIG. 4, a sample HTML document 400 illustrates specification of dynamically-selectable views for multiple components. ALTlet 110, first presented in FIG. 1, is specified for a first component. Next, ALTlet 410 is specified. (Note that it is not necessary that the ALTlets are specified immediately following one another.) This sample ALTlet 410 is used, in this example, to dynamically select advertisement content to be delivered to a requester in the traffic report service scenario that was discussed earlier. The ALTlet type is therefore specified as "advertisement" (see 411), and the values of the "name" attribute for view elements 420, 430, 440 are identical to name attributes from the "subscription" ALTlet 110. The "value" attributes for each view element in ALTlet 410 specify a URL where a corresponding image can be retrieved. In this example, the image to be retrieved for each of the different subscription levels is different.

Two dynamically-variable components are illustrated in the example of FIG. 4, although as stated earlier, a larger number of ALTlets may optionally be specified.

Although not illustrated in the example, an implementation of the present invention may optionally allow different ones of the choices of component-level views for a particular component to be allocated different amounts of display space on the client's GUI. This, in turn, may cause other components of the displayed page to be displayed differently. For example, the "basic" subscription to traffic reports might only require a display space of 80 by 20 pixels, since a textual component is to be rendered, while the image provided for the "intermediate" subscription might require a display space of 200 by 200 pixels. This changeable page layout can be flexibly and easily accommodated using techniques disclosed herein. For example, different-sized advertisement components might be defined and referenced in ALTlets of the Web page template, where the available choices are identified using the same descriptors that are specified in the template for the content components. Or, instead of changing the size of the advertisements, it may be desirable to provide completely different choices of advertisements to accompany the different content components (as has been illustrated in FIG. 4). For example, advertisements for luxury items might be selected for displaying to premium-level subscribers but not to subscribers at other subscription levels. By identifying the selectable component views using a certain set of attribute values or child element values, and identifying the associated advertisements using this same set of attribute values or child element values (e.g., using the "basic" attribute value on one tag to specify the basic content and also using that attribute value on another tag to specify the corresponding advertisement component), an implementation of the present invention that supports this optional processing can perform additional dynamic tailoring of a Web page for the target client (even though, as has been stated, only one Web page template needs to be defined).

Scenarios in which factors other than subscription levels are used to select the appropriate component view from among multiple choices include selections based upon characteristics of the target device (some of which may be determined, for example, by interrogating the User-Agent field of the request header), bandwidth, and current system and network conditions, as stated earlier. To accommodate the target device scenario, for example, attribute values (or child element values) such as "PDA", "cellphone", and "desktopComputer" might be used. When an interplay of factors is used in selecting a component, the attribute or child element values may be created to represent the values of multiple factors. For example, an attribute value of "PDA-basic" could be used to identify a component view that is to be selected if the client device is a PDA and the user's subscription level is "basic", and "cell-wireless" could be used to identify a component view created for delivery over a wireless network to a cell-phone device.

Note also that it is not strictly required that descriptive identifiers are used for the attribute or child element values. Instead, a numeric identifier might be assigned, where the IT professionals (including the Web page designer) are then responsible for identifying the proper selectable component view associated with each different numeric identifier.

It may happen in some cases, particularly when considering multiple external stimuli, that the factor-evaluating logic selects a component-level view that is not directly aligned with certain of the factors being evaluated. For example, if a subscriber has paid for intermediate-level traffic reports, but the evaluating logic determines that available bandwidth has fallen below some threshold value, then the evaluating logic might select the basic-level traffic report (which will consume less bandwidth during transmission to the client).

Referring now to FIG. 5, a flowchart is provided depicting logic that may be used to implement preferred embodiments of the present invention. As shown therein, a client request is received (Block 500) by server-side logic, which then proceeds to build a response (Block 510). Block 520 then tests to see if this response includes an "ALTlet", i.e., whether this response includes markup language tags specifying a selection of component views, as has been described above. If not, then normal processing of the prior art is performed (Block 530).

Otherwise, when the test at Block 520 has a positive result, then the values of the applicable factors are determined (Block 540). Preferably, the applicable factors that should be evaluated are determined from the value of the "type" attribute on the ALTlet tag. (See 112 in FIG. 1 and 411 in FIG. 4, for example.) In preferred embodiments, this attribute value identifies an evaluation routine (for use in Block 540) that is adapted for dynamically locating values of certain factors or external stimuli and determining an evaluation result therefrom. For example, in the subscription-level scenario, the "subscription" attribute value specified at 112 of FIG. 1 may identify a routine that determines a user's subscription level. This routine may be adapted for first obtaining the user's identification from the inbound request header, and then using this identification to consult a repository of user identification-to-subscription level information.

Upon determining the evaluation result, a programmatic selection of the corresponding view from the template Web page is made (Block 550). Code evaluating the applicable factors preferably returns a value matching the value of the "name" attribute for the view that is to be selected (and which has been coded into the ALTlet to carry out the Web page designer's plan for variable component-level views). Thus in the traffic report scenario, the evaluation routine identified with the "subscription" attribute value 112 preferably returns a result of "basic", "intermediate", or "premium". Block 550 then matches that result to the attribute value in one of the view elements 120, 130, 140. (Optionally, the evaluation routine identified with the "advertisement" attribute value 411 in FIG. 4 may be adapted for locating and returning the same evaluation result that was created by the "subscription" evaluation routine, such that one evaluation result effectively dictates another. In other scenarios, different factors may be considered in the evaluation routines, as will be obvious.)

As an alternative, the view selection processing of Block 550 may comprise using an evaluation result indirectly. That is, instead of returning an evaluation result that is identical to one of the specified view names, this alternative may use the evaluation result to consult a mapping of evaluation results-to-view names. In the traffic report example, suppose the evaluation result returns one of "low", "medium", and "high". A mapping may then correlate "low" to "basic", "medium" to "intermediate", and "high" to "premium", for example.

Block 560 then embeds the selected component-level view into the response document being created. Preferably, this further comprises omitting the non-selected views. Refer to FIG. 3, showing how the selected "basic" content 310 has been substituted in place of the ALTlet 110 from FIG. 1. (While the example in FIG. 3 illustrates maintaining the selected view in its original location within the Web page template, this is by way of illustration and not of limitation. As one alternative, the server-side processing may use the syntax corresponding to the selected view to build a new attribute or element.) Any additional ALTlets are preferably processed in an analogous manner (although this iteration has not been illustrated in FIG. 5). Once all ALTlets have been evaluated, the resulting Web page is then returned to the client (Block 570) for rendering (or for other processing to be determined by the client).

As has been demonstrated, the present invention provides advantageous techniques for selecting among varying component-level views for delivery to a requester. Note, however, that it is not strictly necessary that this content is delivered responsive to a "request". Alternatively, component-level views can be tailored and distributed using a "push" model, for example by identifying one or more clients who have subscribed for content updates, and then creating component-level views for those clients based on external stimuli of the type described above. In addition, it may happen that the dynamic component-level selection described herein is performed for reasons other than delivering a Web page to a client. For example, the selection may be performed in order to prepare content for storage (e.g., in a cache). Or, in a non-Web page scenario, techniques disclosed herein may be used to dynamically select a version of one or more components for inclusion in a document (such as an XML document or a document encoded in another markup language) to be stored or to be exchanged between devices (which may include peer-to-peer server document transfer).

While preferred embodiments were described with reference to some factors (such as a user's subscription level, target device type, and so forth) that have a static (or relatively static) value, it is to be understood that this is by way of illustration and not of limitation. The present invention also provides advantageous selection among alternative component-level views based on dynamic values (such as current system/network conditions), or a combination or static and dynamic values (such as subscription level plus available bandwidth).

Furthermore, techniques of the present invention are not limited to use with selectable views of the types explicitly described herein. These techniques are adaptable for use with generally any type of content, examples of which include (by way of illustration but not of limitation) animations, graphics (including scalable vector graphics, or "SVG", images), and so forth.

Techniques disclosed herein may be leveraged to autonomically tune performance of a system/network. When a network is congested, for example, this factor can be used by factor-evaluating logic to dynamically select a less-rich and therefore smaller version of a component, enabling a response message containing that component version to be transmitted across the network with a lessened impact (as compared to transmitting a larger version) on the existing congestion problem. Or, the evaluation logic might be adapted for checking the current hit rate at one or more Web servers. This information might then be used when determining which alternative view(s) to select for delivery to a requester. For example, if a particular Web server is heavily loaded, then evaluation logic might be adapted for selecting a component view designed to minimize additional processing burdens.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of selecting component-level views, comprising steps of:
   receiving, at a server-side device from a requester, a request for content;
   locating a content file to provide the requested content, wherein:
     the content file comprises a first portion of the requested content and a template corresponding to a remaining portion of the requested content; and
     the template specifies, for a content component that forms the remaining portion of the requested content, a plurality of alternative selectable views of the content component, each of the alternative selectable views comprising a corresponding value, and conditions for selecting each of the alternative selectable views;
   evaluating one or more factors to determine an evaluation result, wherein the factors are determined from the conditions specified in the template;
   using the determined evaluation result to select a particular one of the alternative selectable views specified in the template;
   replacing the template, from the content file, with the value corresponding to the selected particular one of the alternative selectable views, thereby specifying the value corresponding to the selected particular one of the alternative selectable views as the remaining portion of the requested content; and
   returning the content file, as revised by the replacing step, from the server-side device to the requester for rendering.

2. The method according to claim 1, wherein the requester is a client-side device.

3. The method according to claim 1, wherein the requested content is a particular Web page and the template is a Web page template comprising syntax that defines the remaining portion of the particular Web page.

4. A computer-implemented system for selecting component-level views, comprising:
- a computer comprising a processor; and
- instructions which execute using the processor to implement functions comprising:
  - receiving, at a server-side device from a requester, a request for content;
  - locating a content file to provide the requested content, wherein:
    - the content file comprises a first portion of the requested content and a template corresponding to a remaining portion of the requested content; and
    - the template specifies, for a content component that forms the remaining portion of the requested content, a plurality of alternative selectable views of the content component, each of the alternative selectable views comprising a corresponding value, and conditions for selecting each of the alternative selectable views;
  - evaluating one or more factors to determine an evaluation result, wherein the factors are determined from the conditions specified in the template;
  - using the determined evaluation result to select a particular one of the alternative selectable views specified in the template;
  - replacing the template, from the content file, with the value corresponding to the selected particular one of the alternative selectable views, thereby specifying the value corresponding to the selected particular one of the alternative selectable views as the remaining portion of the requested content; and
  - returning the content file, as revised by the replacing of the template, from the server-side device to the requester for rendering.

5. The system according to claim 4, wherein the requester is a client-side device.

6. The system according to claim 4, wherein the requested content is a particular Web page and the template is a Web page template comprising syntax that defines the remaining portion of the particular Web page.

7. A computer program product for selecting component-level views, the computer program product embodied on one or more computer-readable storage media and comprising computer-readable program code for:
- receiving, at a server-side device from a requester, a request for content;
- locating a content file to provide the requested content, wherein:
  - the content file comprises a first portion of the requested content and a template corresponding to a remaining portion of the requested content; and
  - the template specifies, for a content component that forms the remaining portion of the requested content, a plurality of alternative selectable views of the content component, each of the alternative selectable views comprising a corresponding value, and conditions for selecting each of the alternative selectable views;
- evaluating one or more factors to determine an evaluation result, wherein the factors are determined from the conditions specified in the template;
- using the determined evaluation result to select a particular one of the alternative selectable views specified in the template;
- replacing the template, from the content file, with the value corresponding to the selected particular one of the alternative selectable views, thereby specifying the value corresponding to the selected particular one of the alternative selectable views as the remaining portion of the requested content; and
- returning the content file, as revised by the replacing of the template, from the server-side device to the requester for rendering.

8. The computer program product according to claim 7, wherein the requester is a client-side device.

9. The computer program product according to claim 7, wherein the requested content is a particular Web page and the template is a Web page template comprising syntax that defines the remaining portion of the particular Web page.

* * * * *